2,720,470

ALLYLAROXYDICHLOROSILANE AND METHOD OF ITS PREPARATION AND APPLICATION TO GLASS

Porter W. Erickson, Silver Spring, and Irving Silver, Mount Rainier, Md., assignors to the United States of America as represented by the Secretary of the Navy No Drawing. Application September 15, 1954, Serial No. 456,345

23 Claims. (Cl. 117—126)

(Granted under Title 35, U. S. Code (1952), sec. 266)

The invention described herein may be manufactured and used by or for the Government of the United States of America for governmental purposes without the payment of any royalties thereon or therefor.

This invention relates to chemical finishes for glass used in reinforced plastics. More particularly, the invention is concerned with a novel organosilicon finish for glass materials and methods of preparation and use thereof in reinforced plastics.

Some of the more detailed aspects of the invention include the problem of developing glass reinforced plastics with improved strength and durability under both favorable and adverse environmental conditions. The invention includes, for example, within its scope novel allylaroxydichlorosilanes useful as chemical finishes for glass materials, their preparation, and methods of applying the finishes to glass and producing an improved laminate therefrom.

Chemical finishes for glass reinforcing materials have been produced heretofore, and while some of these prior art finishes produce laminates with a particular type of thermosetting resin, such as the polyester resins, none give outstanding results with all three of the most commonly used laminating resins, namely the polyester, epoxy and phenolic resins. The prior art finishes have disadvantages other than being limited to a specific resin system such as lack of uniformity and some conditions in the method of application to the glass which are very critical.

The present invention provides a universal-type chemical finish for glass reinforcing materials. We have discovered that glass material pre-treated with the novel chemical finish described herein will form a superior resin-glass bond in a laminate structure having a thermosetting resin, such as polyester, epoxy, and phenolic resins, and glass as components thereof, and the resulting laminate is characterized by improved strength and stiffness, particularly when subjected to adverse environmental conditions such as water and moisture. The novel chemical finish in accordance with this invention is easily applied to glass from a non-polar organic solvent at room temperature and does not require heat or other special treatment to fix the finish.

It is an object of the present invention to provide a new chemical finish for glass materials used in reinforced plastics.

It is another object of the invention to provide a universal-type chemical finish for glass reinforcing materials which produces a superior laminate with a larger number of the commonly used thermosetting laminating resins, such as the polyester, epoxy, and phenolic resins.

It is a further object of the invention to provide a chemical finish for glass materials and method of treating these materials which will result in a greatly improved resin-glass bond in reinforced plastics.

It is a further object of the invention to provide a new chemical finish for glass materials and a method of treating these materials which results in superior reinforced plastics characterized by exceptional strength and stiffness under both favorable and adverse environmental conditions, particularly in the presence of water or high humidity.

It is still a further object of the invention to provide a novel chemical finish for glass materials used in reinforced plastics which may be easily applied from a non-aqueous system under normal ambient conditions, and which does not require further special treatment to fix the finish.

Other objects of the invention and the attendant advantages thereof will be obvious to those skilled in the art as the invention is better understood by referring to the following detailed description.

The chemical finishes of the present invention may be designated for purposes of simplification only by the general formula:

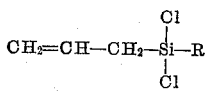

Wherein R is an aroxy group such as phenoxy. A large number of aroxy groups are suitable for substitution as R in the foregoing general formula for the purposes of this invention. Examples among those aroxy groups found to be very satisfactory are phenoxy, and aroxy groups formed by substituting groups such as alkyl, alkenyl, aryl, OH, F, Cl, Br, $NO_2$, alkyl alpha-keto, and alkoxy for hydrogen on the aromatic portion of the phenoxy group. Examples of some of the aroxy groups formed thereby are m-cresoxy, resorcinoxy, catechoxy, 4-chlororesorcinoxy, and m-methoxyphenoxy.

The preparation of the novel finishes of this invention may be illustrated by Examples 1 through 5, but is not limited thereto:

Example 1

Equimolar parts of allyltrichlorosilane and 3,5-xylenol are heated together at about 100° C. with stirring for about 6 hours until the reaction is approximately 90% complete as determined by the loss in weight due to HCl evolved. The entire reaction mixture may be used as a finish without further purification or the purified product, allyl-3,5-xylenoxydichlorosilane, may be obtained and used as a finish by fractional distillation of the reaction mixture at reduced pressure, such as at 10 mm. B. P. 144° C. at 10 mm.; $n_D^{26}$ 1.5032; yield 53%.

Example 2

Equimolar quantities of allyltrichlorosilane and phenol are heated together at about 100° C. with stirring for about 5 hours until the reaction is approximately 90% complete as determined by the loss in weight due to HCl evolved. The entire reaction mixture may be used as a finish without further purification or the purified product, allylphenoxydichlorosilane, may be obtained and used as a finish by fractional distillation of the reaction mixture at reduced pressure, such as at 14 mm. B. P. 110° C. at 14 mm.; $n_D^{26}$ 1.5050; yield 43%.

Example 3

Equimolar parts of allyltrichlorosilane and metacresol are heated together at about 100° C. with stirring for about 4 hours until the reaction is approximately 90% complete as determined by the loss in weight due to HCl evolved. The entire reaction mixture may be used as a finish without further purification or the purified product, allyl-m-cresoxydichlorosilane, may be obtained and used as a finish by fractional distillation of the reaction mixture at reduced pressure, such as at 20 mm. B. P. 125° C. at 20 mm.; $n_D^{26}$ 1.5058; yield 36%.

Example 4

Equimolar quantities of allyltrichlorosilane and resorcinol are heated together at about 100° C. with stirring for about 3 hours. The crude reaction product is an excellent finish without purification or further treatment.

Example 5

Equimolar quantities of allyltrichlorosilane and resorcinol monomethyl ether are heated together with stirring for about 4 hours at about 90° C. On the basis of HCl evolved the reaction goes to 110–120% completion. The entire reaction mixture can be used as a finishing reagent but some benefit is gained by recovering and using the purified product. This material, allyl-m-methoxyphenoxydichlorosilane, distills at 147° C. at 8 mm. pressure. The yield was 41%.

The reaction product resulting from the reaction of equimolar parts of an aromatic hydroxyl compound and allyltrichlorosilane may be purified before use, but in all cases it has been found to be satisfactory as a finish without isolation. The crude reaction mixture, or pure reaction product, is preferably applied to the glass before a laminating resin is applied thereto. The finish may be applied to desized glass in the form of cloth, roving, slivers, felt, matte, siliceous filler material, or other forms of glass reinforcements, by immersion in a solution of the finish in a non-polar organic solvent such as xylol, toluene, or benzene, or other convenient method of application such as coating, or spraying in a dry atmosphere. The finish is allowed to remain in contact with the glass for periods of time up to one hour at temperatures from room temperature up to 100° C., however heat or other treatment is not necessary to fix the finish. Excess unreacted finish is then removed by washing in xylol, or other suitable manner, followed by open air drying and soaking in water at a convenient temperature such as room temperature or above for a period of time up to about 10 minutes to hydrolyze unreacted chloride in the bulk of the fixed finish. The glass material is then dried and is ready for use in reinforced laminates having a thermosetting resin, such as polyester, epoxy, or phenolic resins, as a component thereof. No change in the method of curing the resin, or in other steps in producing a reinforced laminate is necessary.

A preferred procedure for treating glass reinforcing materials with the novel chemical finish disclosed herein and producing a laminate therefrom is as follows:

Heat cleaned desized glass cloth at room temperature direct from open air storage or in some instances hot after conditioning for periods up to 2 hrs. at 125° C., was placed directly into a .07–2% xylol solution by weight of a finish in accordance with this invention, such as either the crude reaction product of equimolar quantities of allyltrichlorosilane and 3,5-xylenol, or the pure product thereof, allyl-3,5-xylenoxydichlorosilane. After one hour at 80° C., the cloth was removed from the finish solution and washed in xylol to remove excess unreacted reagent and then air dried. The cloth was then soaked in water for up to 10 minutes at room temperature to hydrolyze unreacted chloride in the fixed finish, followed by air drying.

Laminate panels were prepared as follows:

Twelve plies of treated cloth were laid up with satin shafts parallel in adjacent faces. Polyester and epoxy resin impregnation was done at 60° C. and at a reduced pressure of 60±10 mm. to insure uniform impregnation throughout the 12 plies of cloth in one operation. Phenolic resin impregnation was carried out by immersing the cloth in a pool of resin and hanging each ply separately to dry for 30 minutes. The polyester and epoxy resin impregnated panels were cured for about 1 to 1½ hours at a temperature of about 165–240° F. and at a pressure of about 20–40 p. s. i. The phenolic resin impregnated panel was cured for about 2 to 2½ hours at a temperature of about 250–310° F. and at a pressure of about 40 p. s. i.

Flexural tests of the above panels were carried out on ½″ x 4″ specimens, the longer dimension being parallel to the warp direction of the glass cloth. A span depth ratio of 16:1 and a crosshead speed of .05″/minute was used in accordance with ASTM D790–49T. Wet strengths were also obtained after a two hour boil in water followed by 15 minutes in water at 74° F. Results of these tests show that the finish of this invention will give average wet and dry ultimate flexural strengths that exceed those with the best heretofore available finish by 15,000 to 26,000 p. s. i.

The mechanism by which the chemical finish of the present invention results in an improved glass reinforced plastic is not thoroughly understood. However, it is thought that the finish is chemically bonded to the siliceous reinforcement surface through the silicon atom of the finish, leaving two or more different functional groups, such as $CH_2=CH—CH_2—$, OH, and easily alkylated aroxy portions in the finish, which presumably could take part in the curing reaction of two or more different resin systems. Thus the laminating resin and the glass reinforcement surface should be adhesively linked together by primary chemical bonds to produce a high strength structure. It is to be understood that the invention is not limited or dependent upon either the foregoing theory or the presumed general chemical formula for the finish, but is limited only by the patentable scope of the appended claims and dependent on the unusual and unexpected improved properties in plastic reinforcements arising as a result of the novel chemical finish and method for treating glass reinforcements and producing a reinforced plastic therewith.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The method of treating glass reinforcements for plastics which comprises applying an excess of a finish solution comprising allylaroxydichlorosilane in a substantially anhydrous non-polar organic solvent to a desized glass reinforcement, the aromatic portion of said allylaroxydichlorosilane consisting of a single benzene ring structure, removing excess allylaroxydichlorosilane solution from said reinforcement, soaking the reinforcement in water and then drying said reinforcement.

2. The method of treating glass reinforcements for plastics which comprises applying an excess of a finish solution to a desized glass reinforcement, said finish solution comprising the reaction product of equimolar parts of allyltrichlorosilane and an aromatic hydroxyl compound and a substantially anhydrous non-polar organic solvent therefor, the aromatic portion of said hydroxyl compound consisting of a single benzene ring structure allowing said finish solution to remain in contact with said reinforcement for a period of time up to about one hour and at a temperature of about 20–100° C. thereby causing the finish to be fixed to the surface of the glass reinforcement, removing excess finish solution from said reinforcement, soaking said reinforcement in water for a period of time up to about 10 minutes and at about room temperature, and then drying said reinforcement.

3. The method of applying a fixed finish to glass reinforcements for plastics which comprises applying an excess of a finish solution comprising allylaroxydichlorosilane in a substantially anhydrous non-polar organic solvent to a desized glass reinforcement, the aromatic portion of said allylaroxydichlorosilane consisting of a single benzene ring structure, allowing said finish solution to remain in contact with said glass reinforcement for a period of time up to about one hour and at a temperature of about 20–100° C. thereby causing the allylaroxydichlorosilane to be fixed to the surface of the glass reinforcement, removing excess finish solution from said glass reinforcement and evaporating the solvent therefrom, soaking said glass reinforcement in water for a period of time up to about 10 minutes and at about room temperature, and then drying said reinforcement.

4. The method as claimed in claim 3 in which said allylaroxydichlorosilane is allylphenoxydichlorosilane.

5. The method as claimed in claim 3 in which said allylaroxydichlorosilane is allyl-m-cresoxydichlorosilane.

6. The method as claimed in claim 3 in which said allylaroxydichlorosilane is allyl - 3,5 - xylenoxydichlorosilane.

7. The method as claimed in claim 3 in which said allylaroxydichlorosilane is allyl - m-methoxyphenoxydichlorosilane.

8. The method as claimed in claim 3 in which said allylaroxydichlorosilane is the reaction product of equimolar parts of allyltrichlorosilane and resorcinol.

9. A chemical finish for glass reinforcing materials comprising allylaroxydichlorosilane, the aromatic portion of said allylaroxydichlorosilane consisting of a single benzene ring structure.

10. A chemical finish for glass reinforcements comprising allylaroxydichlorosilane and a substantially anhydrous non-polar organic solvent therefor, the aromatic portion of said allylaroxydichlorosilane consisting of a single benzene ring structure.

11. The method of producing allylaroxydichlorosilane comprising the step of reacting equimolar quantities of an aromatic hydroxyl compound and allyltrichlorosilane, the aromatic portion of said aromatic hydroxyl compound consisting of a single benzene ring structure.

12. The method as claimed in claim 11 wherein the said aromatic hydroxyl compound is m-methoxyphenol.

13. The method finish as claimed in claim 11 wherein the said aromatic hydroxyl compound is resorcinol.

14. The method as claimed in claim 11 wherein the said aromatic hydroxyl compound is phenol.

15. The method as claimed in claim 11 wherein the said aromatic hydroxyl compound is meta-cresol.

16. The method as claimed in claim 11 wherein the said aromatic hydroxyl compound is 3,5-xylenol.

17. A composition of matter selected from the group consisting of allylphenoxydichlorosilane, allyl-m-cresoxydichlorosilane, allyl-3,5-xylenoxydichlorosilane and allyl-m-methoxyphenoxydichlorosilane.

18. The new compound allylphenoxydichlorosilane.

19. The new compound allyl-m-cresoxydichlorosilane.

20. The new compound allyl-3,5-xylenoxydichlorosilane.

21. The new compound allyl-m-methoxyphenoxydichlorosilane.

22. The method of treating siliceous reinforcements for plastics which comprises the steps of applying allylaroxydichlorosilane to a siliceous reinforcement, the aromatic portion of said allylaroxydichlorosilane consisting of a single benzene ring structure, soaking the reinforcement in water, and then drying said reinforcement.

23. The method of claim 22, wherein said allylaroxydichlorosilane is dissolved in an anhydrous non-polar organic solvent.

References Cited in the file of this patent

UNITED STATES PATENTS

| | | |
|---|---|---|
| 2,481,349 | Robie | Sept. 6, 1949 |
| 2,595,729 | Swiss | May 6, 1952 |
| 2,637,719 | Dereich | May 5, 1953 |
| 2,649,396 | Witt et al. | Aug. 18, 1953 |